United States Patent [19]

Ogawa

[11] Patent Number: 5,072,546
[45] Date of Patent: Dec. 17, 1991

[54] WEATHER STRIP FOR USE IN AUTOMOBILE

[75] Inventor: Kazuo Ogawa, Aichi, Japan

[73] Assignee: Toyoda Gosei Co., Ltd., Nishikasugai, Japan

[21] Appl. No.: 617,260

[22] Filed: Nov. 21, 1990

Related U.S. Application Data

[63] Continuation of Ser. No. 429,372, Oct. 31, 1989, abandoned.

[30] Foreign Application Priority Data

Dec. 28, 1988 [JP] Japan ............ 63-171502[U]

[51] Int. Cl.⁵ .................................................. F06B 7/16
[52] U.S. Cl. ........................................ 49/491; 49/490
[58] Field of Search .................. 49/490, 491, 496, 497

[56] References Cited

U.S. PATENT DOCUMENTS

| | | | |
|---|---|---|---|
| 3,222,769 | 12/1965 | LePlae | 49/490 X |
| 3,993,819 | 11/1976 | Fewkes | 49/490 X |
| 4,099,765 | 7/1978 | Bright | 49/490 X |
| 4,188,424 | 2/1980 | Ohno et al. | 49/490 X |
| 4,232,081 | 11/1980 | Pullan | 49/490 X |
| 4,424,976 | 1/1984 | Hayashi | 49/491 X |
| 4,430,374 | 2/1984 | Ezaki | 49/490 X |
| 4,769,950 | 9/1988 | Ogawa et al. | 49/490 |

FOREIGN PATENT DOCUMENTS

| | | | |
|---|---|---|---|
| 2352942 | 5/1977 | France | 49/491 |
| 1416151 | 12/1975 | United Kingdom | 49/490 |

Primary Examiner—Rodney M. Lindsey
Assistant Examiner—Jerry Redman
Attorney, Agent, or Firm—Cushman, Darby & Cushman

[57] ABSTRACT

A weather strip for mounting on a flange provided along a peripheral edge portion of an opening in a body of an automobile, including a trim portion of a U-shaped cross-section for being fitted on the flange, the trim portion having a pair of opposed side walls and holder lips which are formed on the inner surface of each of the opposed side walls and extend to the opposite side wall; a seal portion formed on an outer surface of one of the side walls which is adapted to be directed toward the exterior of the automobile body when the weather strip is mounted on the flange, the seal portion projecting outwardly from a generally central portion of the one side wall and being adapted to be pressed against a closure member for closing the opening; a seal lip extending from a distal end of the one side wall so as to be pressed against a portion of a body panel extending along the flange; and a core member embedded in the trim portion, the core member having a row of core elements spaced at a predetermined distance from one another. The core member has connective portions interconnecting the core elements so that when the trim portion is bent along a corner portion of the peripheral edge portion of the opening, the connective portions being either disposed in the one side wall and disposed inwardly of the neutral axis of the bending or disposed in the other side wall and disposed outwardly of the neutral axis.

2 Claims, 5 Drawing Sheets

WEATHER STRIP FOR USE IN AUTOMOBILE

This is a continuation of application Ser. No. 07/429,372, filed on Oct. 31, 1989, which was abandoned upon the filing hereof.

BACKGROUND OF THE INVENTION

1. Field of the Invention

This invention relates generally to a weather strip for use in an automobile, and more particularly to a weather strip for mounting along a peripheral edge portion of an opening formed in the automobile body, such as a window opening and an opening closed by a door (hereinafter referred to as "door opening").

2. Prior Art

A conventional weather strip is mounted along a peripheral edge portion of a window opening or a door opening, and when the opening is closed by a closure member such as a window glass pane or a door, the weather strip forms a seal between the peripheral edge portion of the opening and the closure member.

FIGS. 9 and 10 shows a typical example of such conventional weather strips. More specifically, this weather strip 3 is designed to be mounted along a peripheral edge portion of a quarter window opening 1 (see FIG. 1). The weather strip 3 includes a trim portion 31 of U-shaped cross- section, a hollow seal portion 32 formed on one side wall 31a of the trim portion 31, and a seal lip 33 formed on a distal end of the side wall 31a. A core means 4 in the form of discrete core elements 40 of a U-shaped cross-section is embedded in the trim portion 31, the core elements 40 being embedded in the trim portion 31 in spaced relation to one another. Another core member having such U-shaped core elements connected together at their bases of the U-shape is also known.

The weather strip 3 is mounted on a flange 11 provided on the peripheral edge portion of the quarter window opening in such a manner that the flange 11 is held between opposed holder lips 34 formed on the opposed inner surfaces of the trim portion 31. When the quarter window opening is closed by a window glass pane 2, the seal portion 32 is pressed against the glass pane 2.

When the weather strip is to be mounted relative to the opening in the automobile body, the weather strip is bent or flexed along a corner portion (for example, a corner portion C in FIG. 1). At this time, the weather strip is bent in the direction of a line B (the center line of the U-shaped cross-section of the trim portion 31) indicated in FIG. 9 in such a manner that the open end of the trim portion 31 is directed outwardly. In this case, the inward portion of the weather strip disposed inwardly of the neutral axis A of this bent portion is compressed whereas the outward portion of the weather strip disposed outwardly of the neutral axis A is elongated or extended. That portion of the weather strip disposed at the neutral axis A is neither compressed nor extended.

It is known, however, that the weather strip thus bent at the above corner portion is turned to be tilted in a direction of an arrow Y as shown in FIG. 10. When such tilting is excessive, the seal lip 33 fails to be pressed against a body panel 10 and hence is spaced therefrom.

SUMMARY OF THE INVENTION

It is therefore an object of this invention to provide a weather strip which will not tilt in the above-mentioned manner when it is bent at a corner portion of an opening.

The inventors have conducted extensive studies and experiments and have found that the tilting of the weather strip results from the fact that when the weather strip is bent, the extended portion of one side wall 31a of the trim portion 31 on which the seal portion 32 is formed is subjected to a greater pulling force (that is, a force tending to return it to the original shape) than the extended portion of the other side wall 31b. This is because the seal lip 33 is formed on the distal end of the one side wall 31a. Incidentally, in the case where the one side wall 31a is not provided with the seal lip 33 and is merely made longer than the other side wall 31b, a similar tilting occurs. It is thought that such tilting occurs for the same reason.

The present invention has been made based on the above findings, and according to the present invention, the following procedures are employed to prevent the weather strip from tilting:

(1) As shown in FIG. 6, a core member 4 is embedded in a trim portion 31 of a weather strip, the core member having core elements 40 and connective portions 41 which are disposed in one side wall 31a of the trim portion (which has a seal portion 32 and is adapted to be directed to the exterior of the automobile body when the weather strip is mounted relative to an opening in the automobile body) and interconnect the core elements at a position disposed inwardly of the neutral axis A of the bent trim portion, that is, within a range D1.

(2) Another core member 4 is embedded in a trim portion 31 of a weather strip, the core member having core elements 40 and connective portions 41 which are disposed in the other side wall 31b of the trim portion and interconnect the core elements at a position disposed outwardly of the neutral axis A of the bent trim portion, that is, within a range D2.

(3) There is used a further modified core member 4 having core elements which are interconnected by two groups of connective portions 41 disposed respectively within the two regions D1 and D2 is also used.

In the case of the above procedure (1), the neutral axis in the one side wall 31a is displaced to the position of the connective portions, and as a result, the neutral axis in the other side wall 31b is displaced outwardly. Therefore, when the weather strip is bent, a pulling force acting on the extended portion of the other side wall 31b is increased to produce a turning force in a direction of an arrow Z. As a result, this force cancels the above-mentioned force acting in the Y-direction, thereby achieving a balance to prevent tiling.

In the case of the above procedure (2), the principle is the same, and the neutral axis in the other side wall 31b is displaced outwardly, that is, to the extended portion thereof, thereby preventing tilting as in the procedure (1).

In the case of the above procedure (3), the procedures (1) and (2) are combined, and therefore naturally tilting is prevented.

DESCRIPTION OF THE PREFERRED EMBODIMENTS OF THE INVENTION

The invention will now be described with reference to the drawings.

Figure 2:
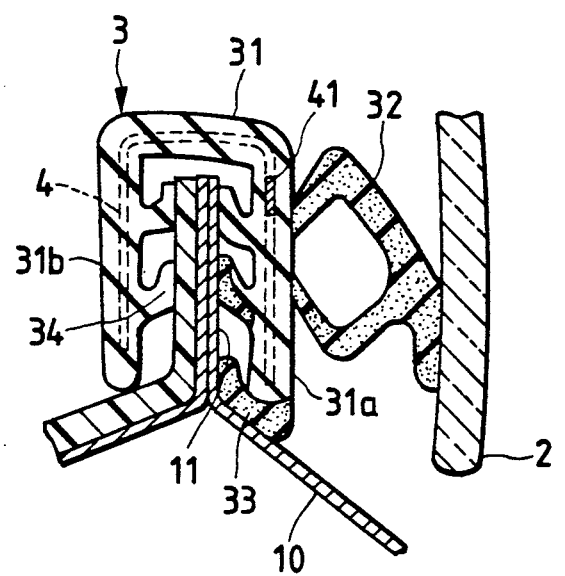
FIG. 2 a cross-sectional view of the weather strip taken along the line II—II of FIG. 1.
Figure 3:
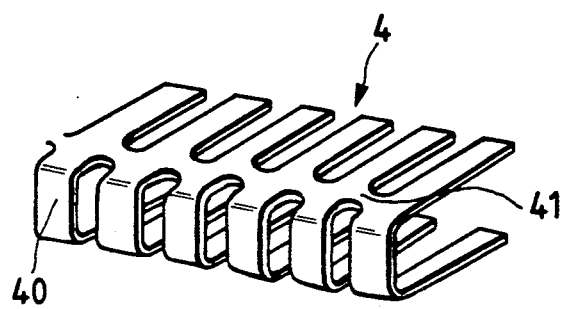
FIG. 3 is a perspective view of a portion of a core member used in the weather strip.

FIGS. 2 and 3 show a first preferred embodiment of the invention. A weather strip 3 includes a body which is formed by extrusion molding. The body of the weather strip 3 includes a trim portion 31 of a U-shaped cross-section defined by a pair of opposed side walls 31a and 31b and a base interconnecting the side walls at their one ends, a hollow seal portion 32 formed on and extending along the outer surface of one side wall 31a, and a seal lip 33 extending from the distal end of the one side wall 31a. The seal portion 32 projects outwardly from a generally central portion of the one side wall 31a. Holder lips 34 are formed on the inner surface of each of the opposed side walls 31a and 32b and extend to the opposite side wall. A core member 4 is embedded in the trim portion 3. The trim portion 31 as well as the holder lips 34 is made of solid rubber except for part of some of the holder lips 34. That part as well as the seal portion 32 and the seal lip 33 is made of sponge rubber.

Figure 6:
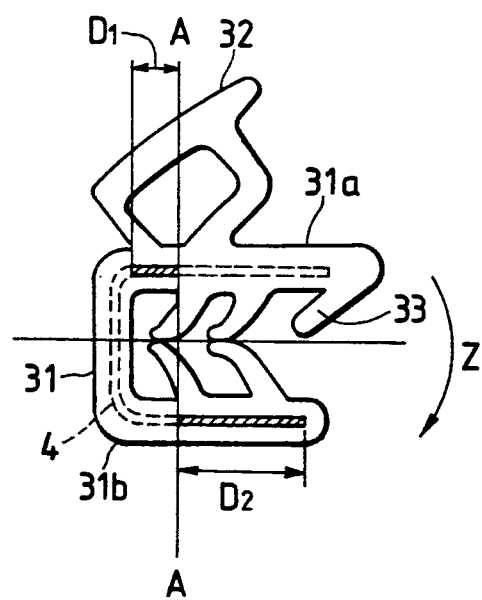
FIG. 6 is a schematic view showing the position of interconnection of core elements.

As best shown in FIG. 3, the core member 4 has a row of core elements 40 disposed in spaced relation to one another and interconnected by connective portions 41. Each core element 40 is of a U-shape defined by a pair of opposed arms and a base interconnecting the opposed arms at their one ends. The connective portion 41 interconnects one arm of each adjacent core element 40 which are embedded in the one side wall 31a of the trim portion 31. The connective portion 41 is disposed adjacent to the base of the U-shaped trim portion 31, and is disposed inwardly of the neutral axis A of the bending, that is, at a region D1 (FIG. 6).

Figure 4:
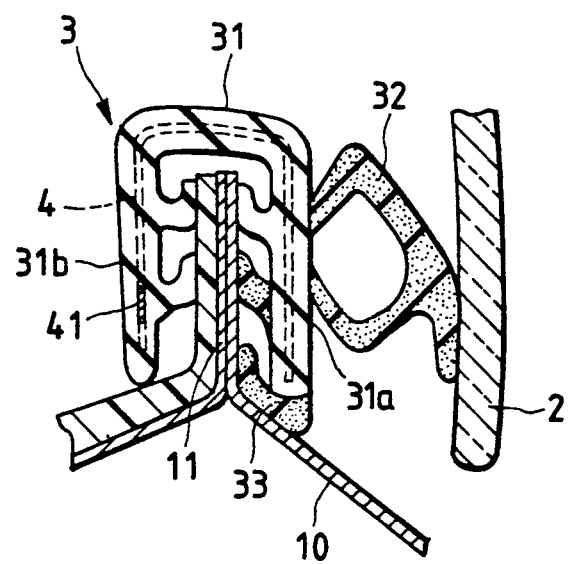
FIG. 4 is a view similar to FIG. 2 but showing a modified weather strip.
Figure 5:
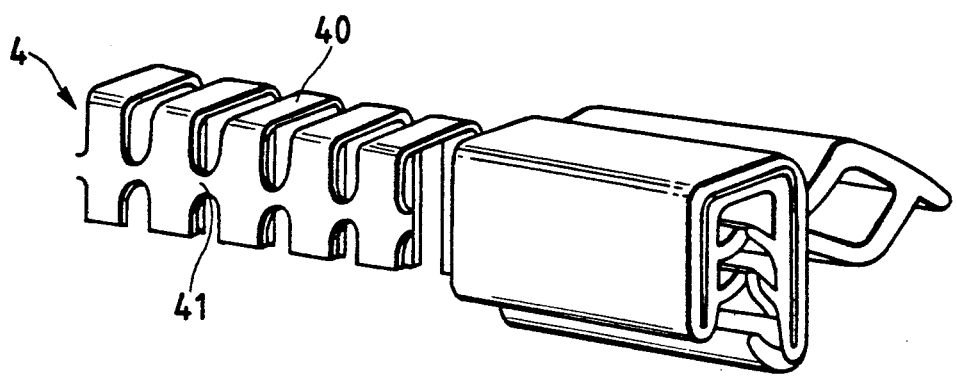
FIG. 5 is a perspective view of a portion of the weather strip of FIG. 4.

FIGS. 4 and 5 shows a second preferred embodiment of a weather strip which differs from the weather strip of FIGS. 2 and 3 only in that a modified core member 4 is employed. More specifically, each connective portion 41 interconnects one arm of each adjacent core element 40 which are embedded in the other side wall 31b of the trim portion 31. The connective portion 41 is disposed outwardly of the neutral axis A of the bending, that is, at a region D2 (FIG. 6).

Figure 1:
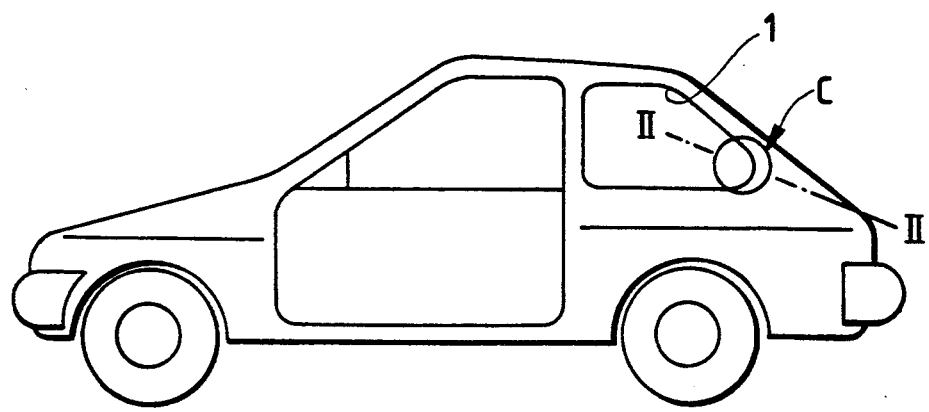
FIG. 1 is a side-elevational view of an automobile to which a weather strip according to the present invention is applied.

As shown in FIGS. 2 and 4, the weather strip of each of the above first and second embodiments is adapted to be mounted on a flange 11 provided on the peripheral edge portion of a quarter window opening 1 (see FIG. 1) in such a manner that the flange 11 is held between opposed holder lips 34 formed on the opposed inner surfaces of the trim portion 31. When the quarter window opening is closed by a window glass pane 2, the seal portion 32 is pressed against the glass pane 2.

Figure 10:
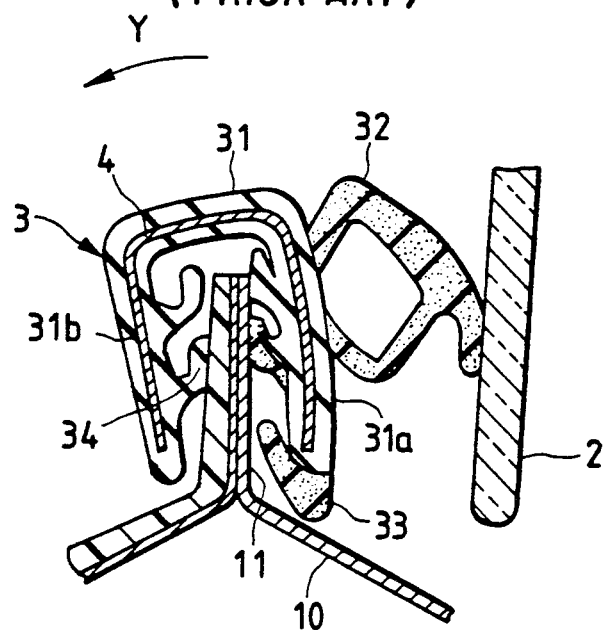
FIG. 10 is a cross-sectional view of the conventional weather strip, showing a portion thereof at a corner portion of an opening in an automobile.

When the weather strip of each embodiment is thus mounted relative to the quarter window opening 1 in such a manner that the weather strip is bent or flexed along a corner portion C (see FIG. 1) of the peripheral edge portion of the quarter window opening, the weather strip will not tilt relative to the flange 11 and will be held in position, unlike the conventional weather strip which is tilted as shown in FIG. 10. Therefore, the seal lip 33 is pressed against a body panel 10, thus providing an improved seal and an improved appearance.

The connective portion 41 is disposed in such a position within the range D1 or the range D2 (FIG. 6) that the weather strip will not tilt so as to that it will be held in position.

According to another modified form of the invention, the core elements 40 are interconnected by both the connective portions 41 of the first embodiment (which are provided at the region D1) and the connective portions 41 of the second embodiment (which are provided at the region D2). In this case, similar effects can be achieved.

Figure 7:
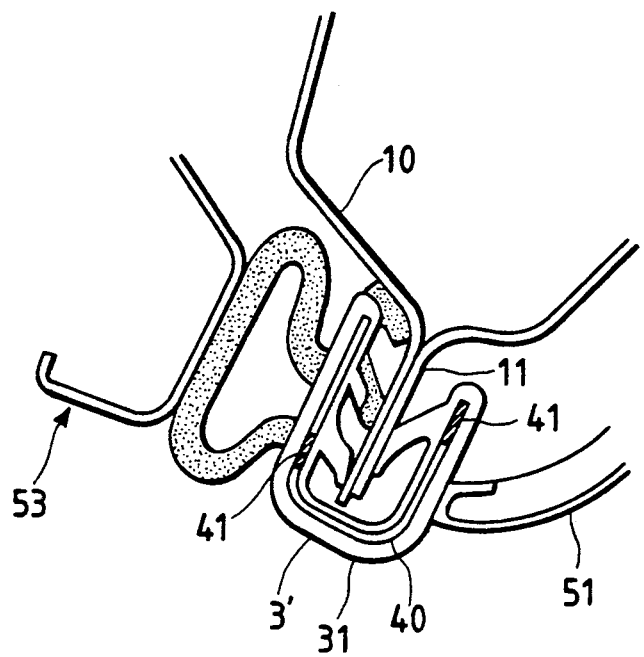
FIG. 7 is a view similar to FIG. 2 but showing a modified weather strip.

FIG. 7 shows a third preferred embodiment of a weather strip 3' which is mounted along a flange 11 provided on the peripheral edge portion of a door opening. One of the connective portions 41 is disposed adjacent to the base of the U-shaped trim portion 31, and is disposed inwardly of the neural axis A of the bending, that is, at a region D1 (FIG. 6). The other of the connective portions 41 is disposed outwardly of the neutral axis A of the bending, that is, at a region D2 (FIG. 6). However, it is possible to omit one of the connective portions. Reference numeral 53 denotes a door frame and reference numeral 51 denotes a roof side inner garnish.

Figure 8:
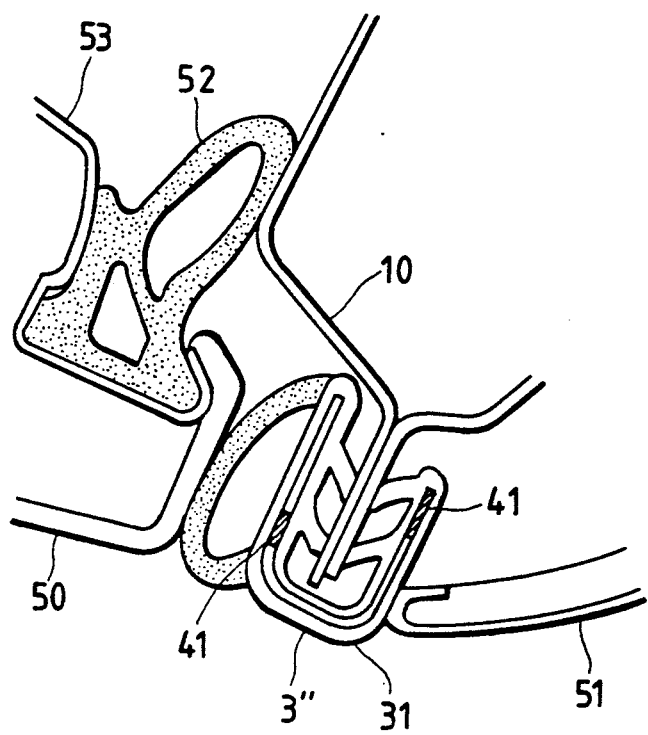
FIG. 8 a view similar to FIG. 2 but showing a modified weather strip.
Figure 9:
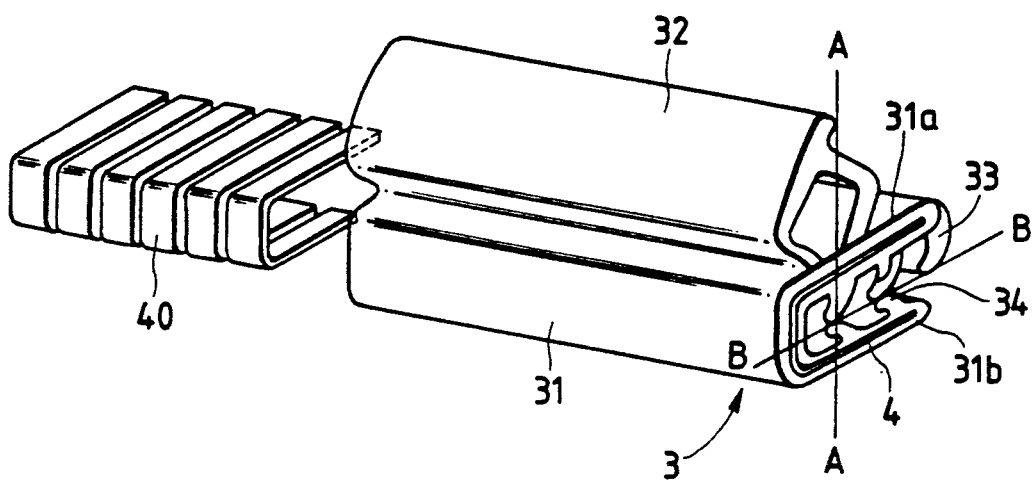
FIG. 9 is a perspective view of a portion of a conventional weather strip.

FIG. 8 shows a forth preferred embodiment of a weather strip 3" which is mounted along a opening trim. One of the connective portions 41 is disposed adjacent to the base of the U-shaped trim portion 31, and is disposed inwardly of the neutral axis A of the bending, that is, at a region D1 (FIG. 6). The other of the connective portions 41 is disposed outwardly of the neural axis A of the bending, that is, at a region D2 (FIG. 6). However, it is possible to omit one of the connective portions. Reference numeral 50 denotes a door frame garnish and reference numeral 51 denotes a roof side inner garnish 52 denotes a door weather strip. Reference numeral 53 denotes a door frame.

While the invention has been described in detail and with reference to specific embodiments thereof, it will be apparent to one skilled in the art that various changes and modifications can be made therein without departing from the spirit and scope of the invention which is limited only by the appended claims.

What is claimed is:

1. In a weather strip for mounting on a flange provided along a peripheral edge portion of an opening in a body of an automobile, comprising:

(a) a trim portion of U-shaped cross-section for being fitted on the flange, said trim portion having inner and outer side walls and holder lips which are formed on the inner surface of each of the inner and outer side walls and extend to the opposite side wall the trim portion being bent in such a manner that the opening side of said U-shaped cross section of said trim portion is directed radially outwardly of the bend when said weather strip is mounted on said flange;

(b) a seal portion formed on an outer surface of said outer side wall which is adapted to be directed toward the exterior of the automobile body when said weather strip is mounted on the flange, said seal portion protection outwardly from a generally central portion of said outer side wall and being adapted to be pressed against a closure member for closing the opening;

(c) a seal lip extending from a distal end of said outer side wall so as to be pressed against a portion of a body panel extending along the flange; and (d) a core member embedded in said trim portion, said core member having a row of core elements spaced at a predetermined distance from one another;

said core member having consecutive portions interconnecting said core elements; when said trim portion is bent along a corner portion of the peripheral edge portion of the opening, said connective portions being disposed in said outer side wall, radially inwardly of a neutral axis of the bending when said weather strip is mounted on said flange.

2. A weather strip according to claim 1, further comprising another connective portion disposed in the inner side wall, outwardly of said neutral axis.

* * * * *